US012131388B2

(12) United States Patent
Khare et al.

(10) Patent No.: US 12,131,388 B2
(45) Date of Patent: Oct. 29, 2024

(54) SYSTEM FOR DATA INTEGRITY MONITORING AND SECURITIZATION

(71) Applicant: BANK OF AMERICA CORPORATION, Charlotte, NC (US)

(72) Inventors: Prashant Khare, Maharashtra (IN); Prashant Anna Bidkar, Delhi (IN); Anjani Mishra, New Delhi (IN); Ranjan Verma, Haryana (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 441 days.

(21) Appl. No.: 17/117,694

(22) Filed: Dec. 10, 2020

(65) Prior Publication Data

US 2022/0188459 A1 Jun. 16, 2022

(51) Int. Cl.
*G06Q 40/12* (2023.01)

(52) U.S. Cl.
CPC ......... *G06Q 40/12* (2013.12); *G06Q 2220/00* (2013.01)

(58) Field of Classification Search
CPC ........................... G06Q 40/12; G06Q 2220/00
USPC ........................................................... 705/50
See application file for complete search history.

(56) References Cited

U.S. PATENT DOCUMENTS 10,037,533 B2 7/2018 Caldera
10,250,583 B2 4/2019 Caldera et al.
10,482,470 B2 11/2019 Larson et al.
10,510,034 B2 12/2019 Larson et al.
10,510,079 B2 12/2019 Larson et al.
10,855,446 B2 12/2020 Ow et al.
10,904,259 B1 1/2021 Rose
11,019,090 B1 * 5/2021 Smith ..................... G06F 21/40
11,348,448 B1 * 5/2022 Adams .................. H04L 43/045
2018/0075527 A1 * 3/2018 Nagla ................ G06F 21/6218
2018/0082291 A1 3/2018 Allen et al.
2018/0234433 A1 8/2018 Oberhauser et al.
2018/0293553 A1 10/2018 Dembo et al.
2018/0316665 A1 11/2018 Caldera et al.
2018/0342015 A1 11/2018 Austin et al.
2019/0034932 A1 * 1/2019 Sadaghiani ........... G06N 20/00
2019/0095916 A1 3/2019 Jackson
2019/0188793 A1 6/2019 Molinari et al.
2019/0222567 A1 7/2019 Caldera et al.
2019/0259033 A1 * 8/2019 Reddy ...................... G06N 5/02
2019/0303781 A1 * 10/2019 Clark ...................... G06F 40/30
2019/0312869 A1 * 10/2019 Han ........................ G06F 21/64
2019/0324958 A1 10/2019 Ow et al.
2019/0327082 A1 10/2019 Ow et al.
2019/0385170 A1 * 12/2019 Arrabothu ................ G06N 3/08
2020/0034842 A1 * 1/2020 Ponniah ................ G06Q 40/03

(Continued)

*Primary Examiner* — Courtney P Jones
(74) *Attorney, Agent, or Firm* — Moore & Van Allen PLLC; Nicholas C. Russell

(57) ABSTRACT

The systems and methods described include the ability to store such information in an immutable and distributed, verifiable fashion. Furthermore, the system includes enhanced means for retrieving, interacting with, and visualizing such information via user interface on a variety of user device types. The system is further configured to intelligently determine data forwarding decisions based on one or more configurable data guidelines as determined by one or more entities or third party systems, and provide access to verified data to these entities and systems.

17 Claims, 8 Drawing Sheets

700

RECEIVE A SET OF USER RESOURCE DATA VIA A FIRST DATA CHANNEL 701

STORE THE USER RESOURCE DATA ON A DISTRIBUTED REGISTER OR SHARED DATASTORE 702

PROVIDE ACCESS TO THE DISTRIBUTED REGISTER DATABASE TO A MACHINE LEARNING ENGINE 703

RETRIEVE THE USER RESOURCE TRANSACTION DATA FROM THE DISTRIBUTED REGISTER DATABASE 704

ANALYZE THE USER RESOURCE TRANSACTION DATA TO IDENTIFY IF REPORTING IS REQUIRED 705

STORE ANALYSIS INFORMATION IN KNOWLEDGE GRAPH FORMAT ON DISTRIBUTED REGISTER DATABASE 706

BASED ON ANALYSIS DATA, AUTOMATE USER OUTREACH OR THIRD PARTY ENTITY REPORTING 707

(56) References Cited

U.S. PATENT DOCUMENTS

| | | | | |
|---|---|---|---|---|
| 2020/0044848 | A1 | 2/2020 | Chari et al. | |
| 2020/0167860 | A1 | 5/2020 | Lau | |
| 2020/0220886 | A1* | 7/2020 | George | H04L 63/0236 |
| 2020/0267137 | A1* | 8/2020 | Sambhar | H04L 63/20 |
| 2020/0320631 | A1 | 10/2020 | Gordon, III et al. | |
| 2021/0073819 | A1* | 3/2021 | Hernandez | G06Q 20/4016 |
| 2021/0150623 | A1* | 5/2021 | Rostami | G06Q 20/36 |
| 2021/0182874 | A1* | 6/2021 | Gurnov | G06Q 10/10 |
| 2021/0192652 | A1* | 6/2021 | Blaikie, III | G06F 16/245 |
| 2021/0224922 | A1* | 7/2021 | Juban | G06Q 20/382 |

* cited by examiner

SYSTEM FOR DATA INTEGRITY MONITORING AND SECURITIZATION

FIELD OF THE INVENTION

The present invention is generally related to systems and methods for enhanced analysis and monitoring of resource transaction data in order to determine anomalous or potentially harmful patterns and securely store a record of such information.

BACKGROUND

Existing systems for monitoring resource transactions may rely on corruptible or otherwise manipulatable data storage infrastructures. As such, there is a need for a system for analysis and monitoring of such information that includes the ability to store this information in an immutable and preferably distributed, verifiable fashion. Furthermore, an ideal system would include enhanced means for retrieving, interacting with, and visualizing such information via user interface on a variety of user device types.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later. Embodiments of the present invention address the above needs by providing a system for analysis and monitoring of resource transaction information. The systems and methods described include the ability to store such information in an immutable and distributed, verifiable fashion. Furthermore, the system includes enhanced means for retrieving, interacting with, and visualizing such information via user interface on a variety of user device types. The system is further configured to intelligently determine data forwarding decisions based on one or more configurable data guidelines as determined by one or more entities or third party systems, and provide access to verified data to these entities and systems. Furthermore, the system is configured to receive user input through multiple communication channels. The system is further configured to switch between the various communication channels seamlessly, and in real-time. In some instances, the system comprises: at least one memory device with computer-readable program code stored thereon, at least one communication device, at least one processing device operatively coupled to the at least one memory device and the at least one communication device, wherein executing the computer-readable program code is typically configured to cause the at least one processing device to perform, execute or implement one or more features or steps of the invention.

Embodiments of the invention relate to systems, computer implemented methods, and computer program products for data integrity monitoring and securitization, the system comprising: receive resource transaction data and user data from multiple information channels; store the resource transaction data and user data on a distributed register database; provide access to the distributed register database to a machine learning engine trained to identify anomalous resource transaction patterns and user relationships; store identified anomalies and user relationships in a knowledge graph format on the distributed register database; generate an alert based on one or more identified anomalies and user relationships and store the alert on the distributed register database; analyze the generated alert to identify one or more reporting requirements; and based on the one or more reporting requirements, automate reporting of relevant data to one or more third parties or implement a control action.

In some embodiments, the multiple information channels comprise resource transaction history logs, merchant data, social media data, and resource account data of a plurality of users.

In some embodiments, automating reporting of relevant data to one or more third parties further comprises providing permissioned access to the relevant data via a distributed register application.

In some embodiments, automating reporting of relevant data to one or more third parties further comprises providing a reference hash value identifying one or more block entries in the distributed register database.

In some embodiments, the control action comprises closing a resource account of a user.

In some embodiments, the control action further comprises automating an outreach to one or more users, wherein the outreach comprises a request for additional information.

In some embodiments, the user relationships further comprise a degree of separation between a plurality of users indicated by social media data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
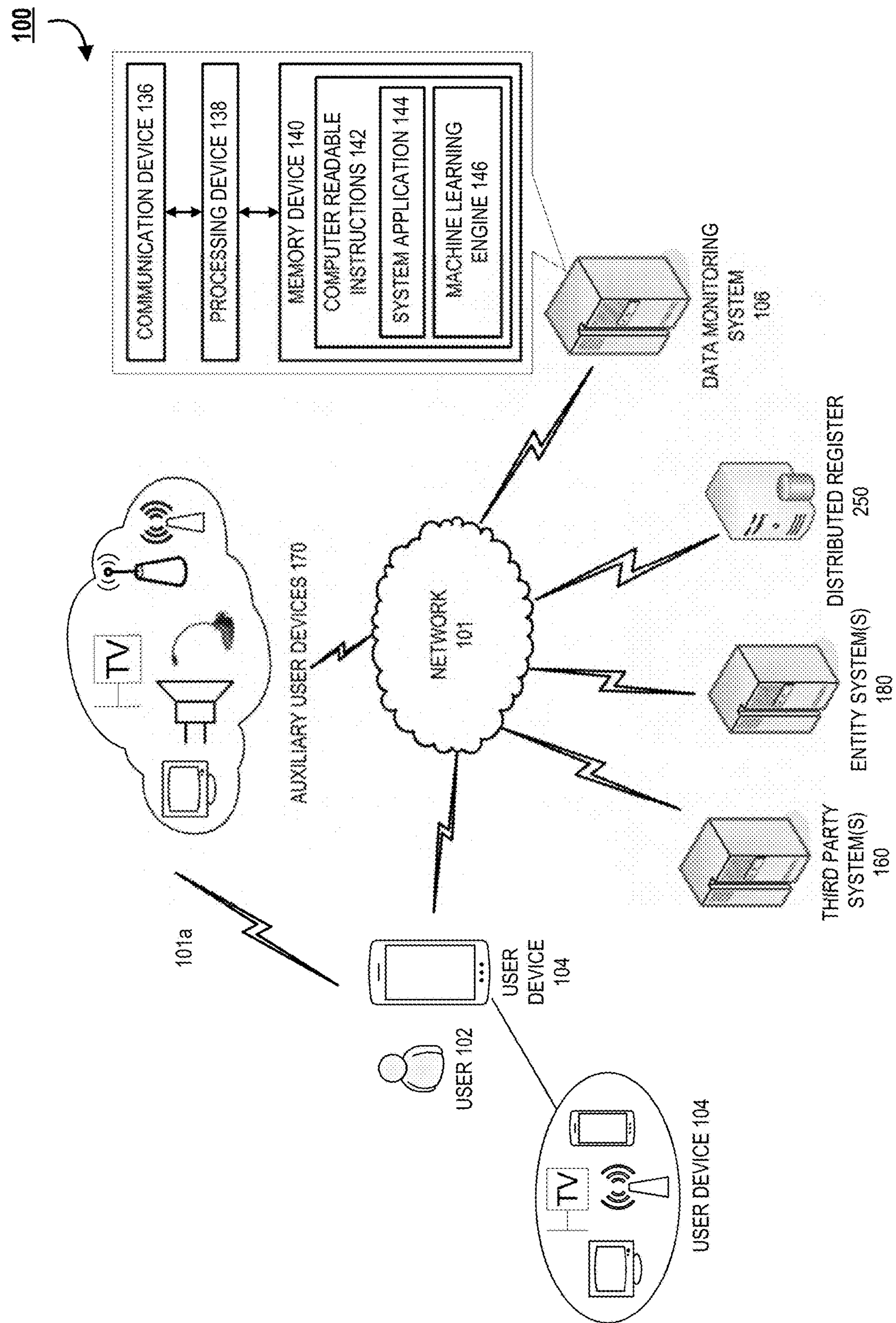
Figure 2:
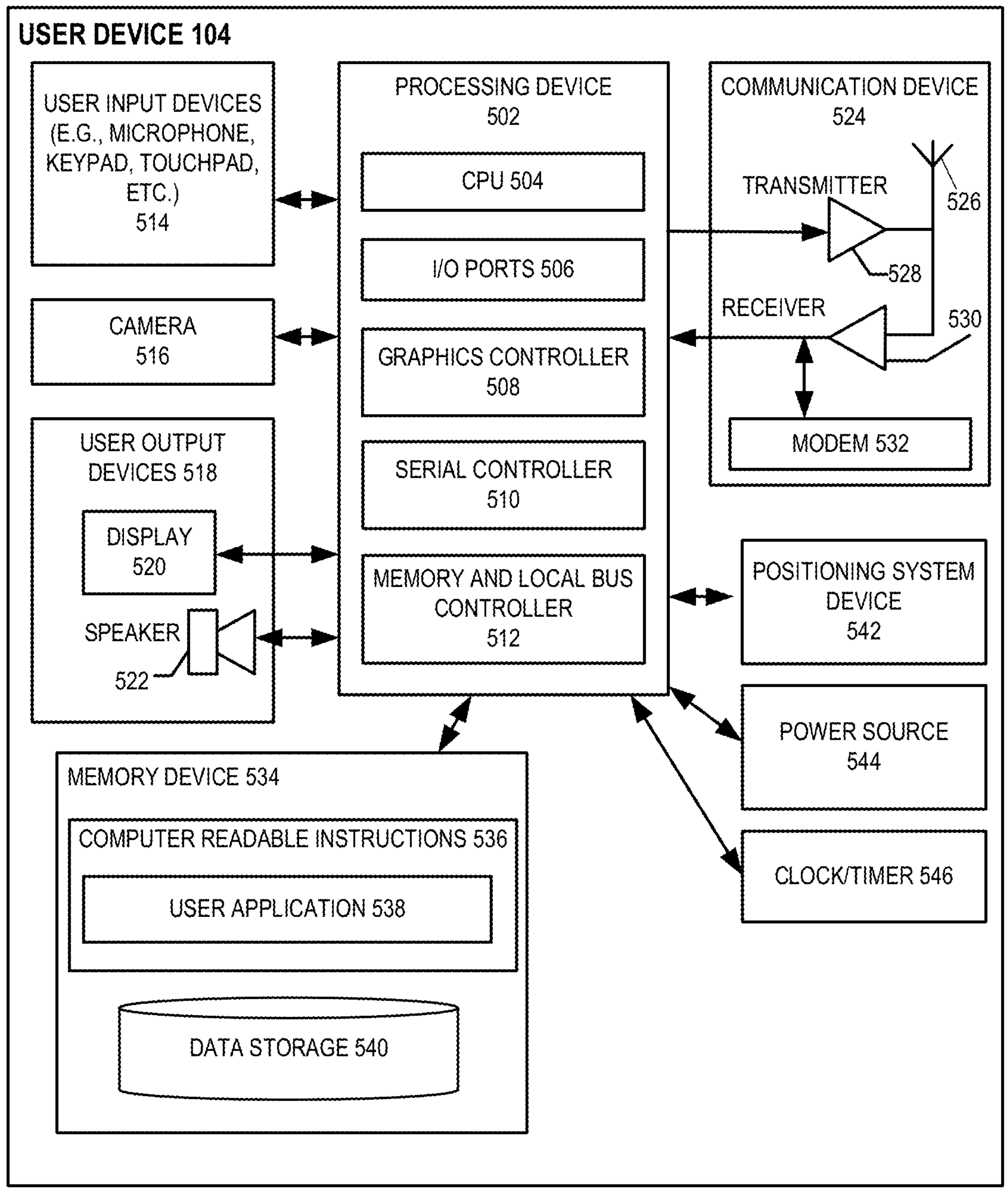
Figure 3:
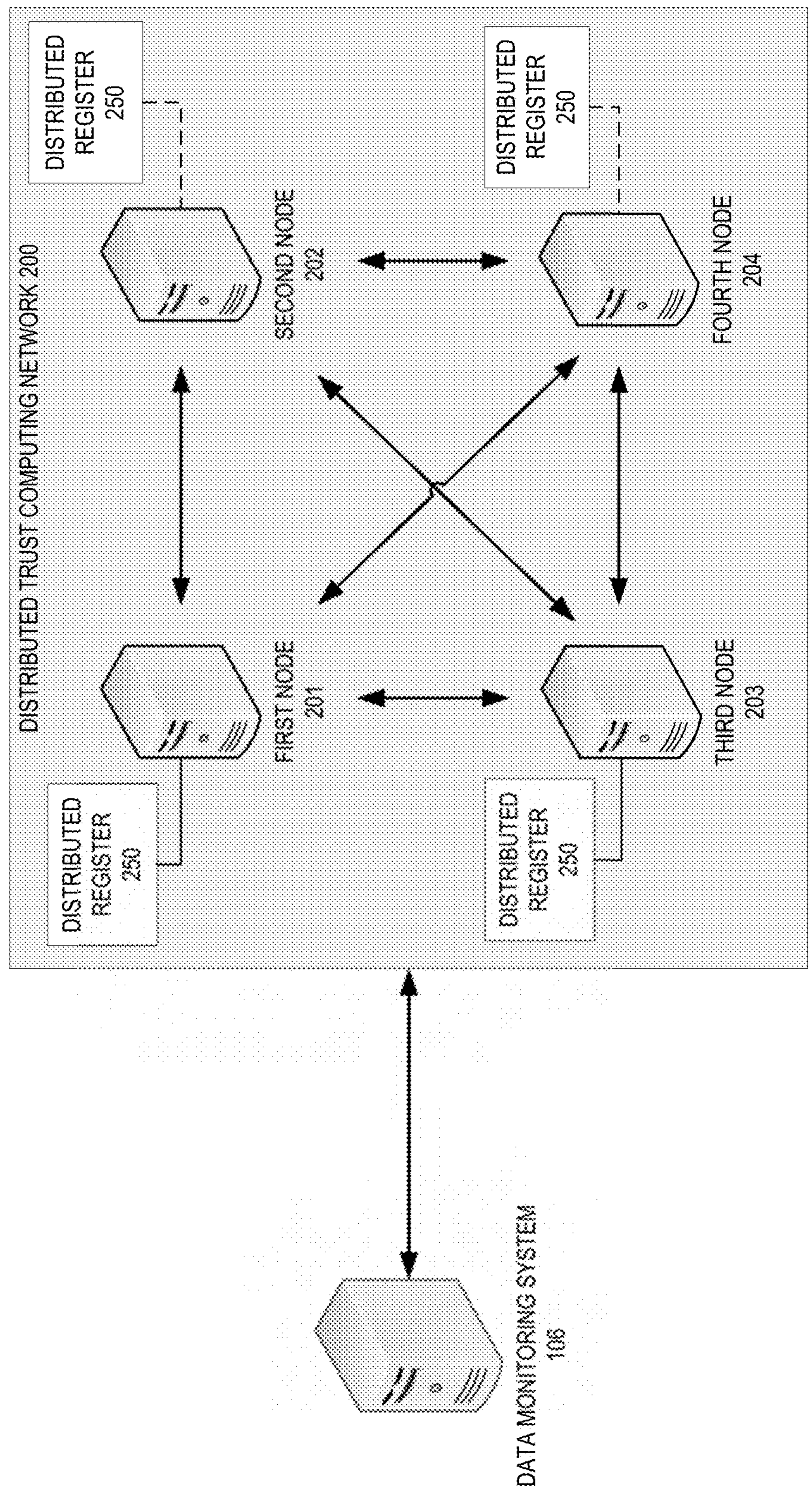
Figure 4:
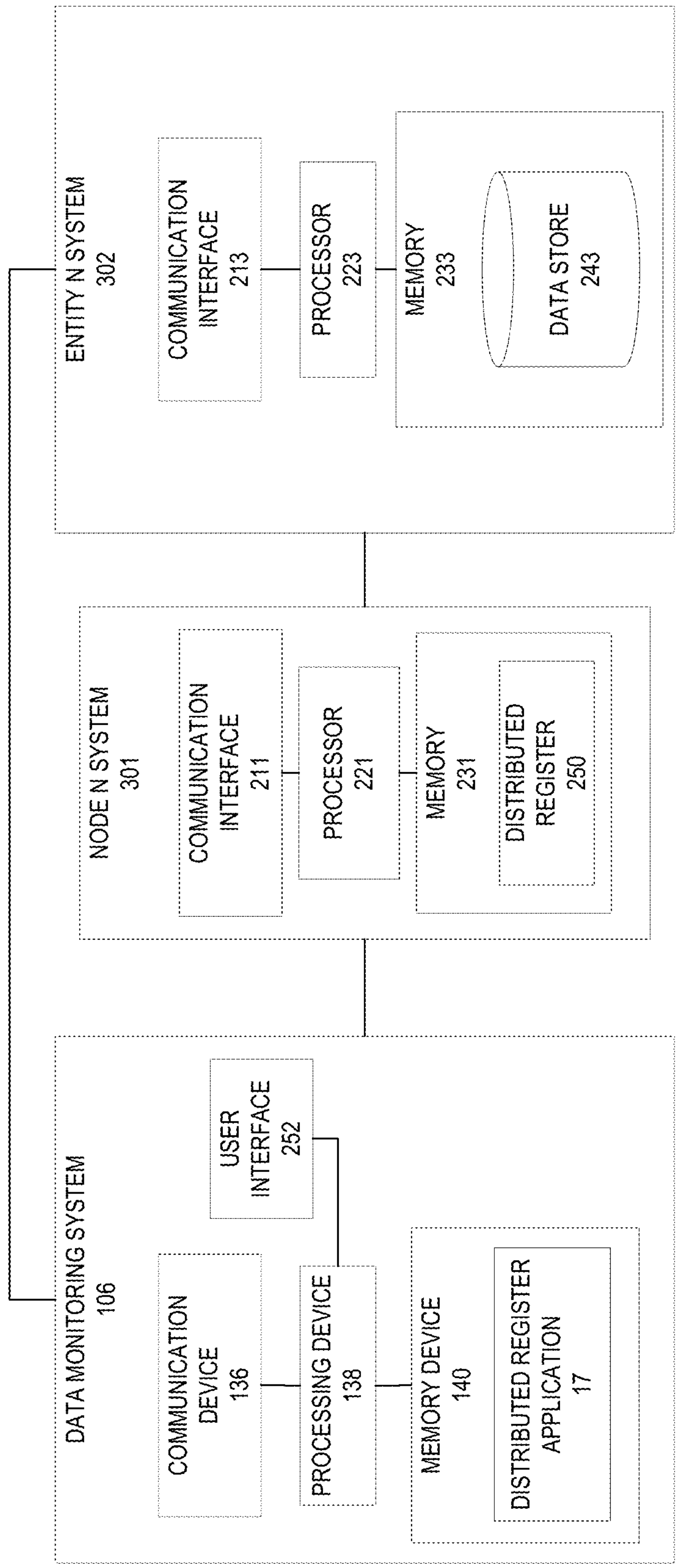
Figure 5:
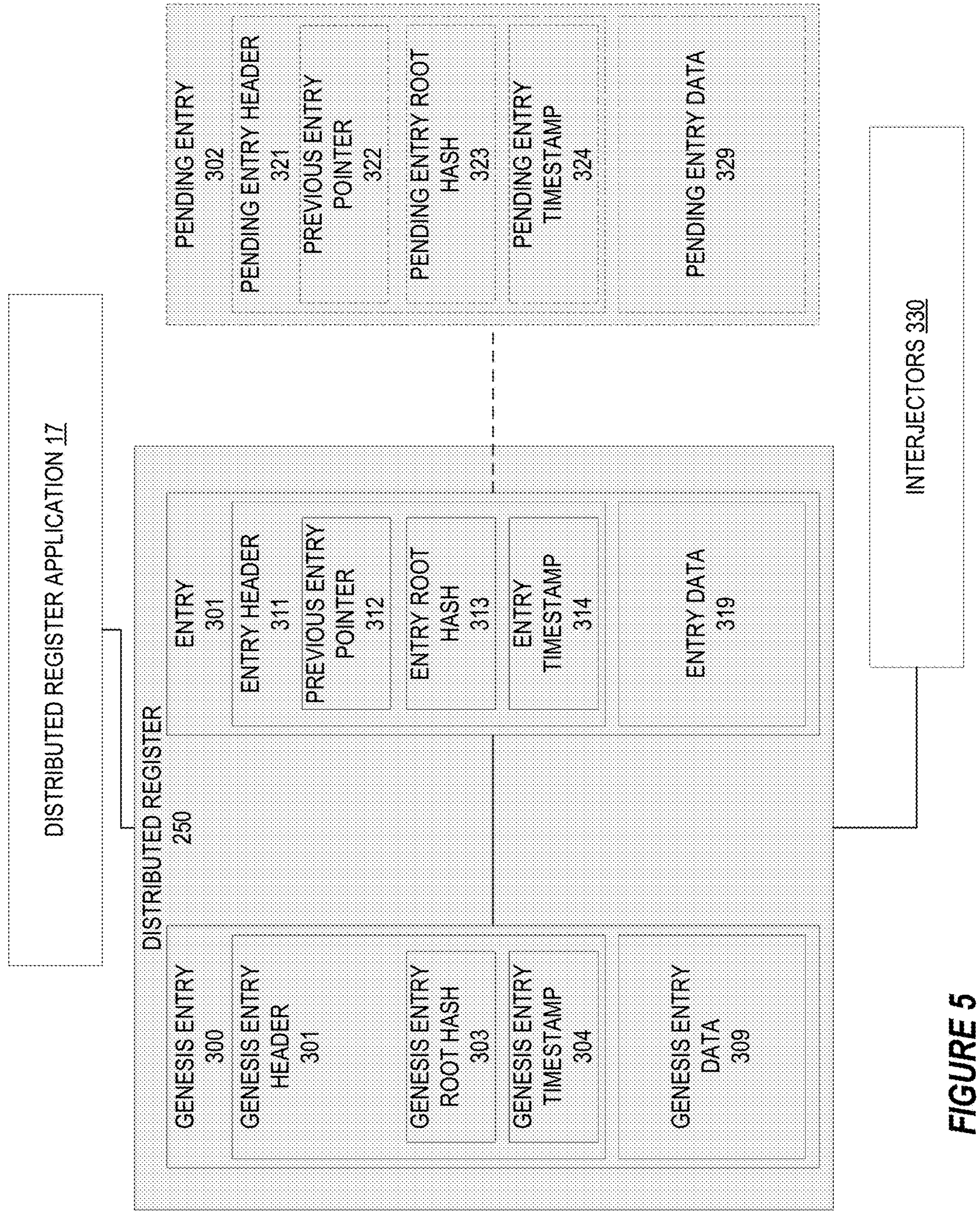
Figure 6A:
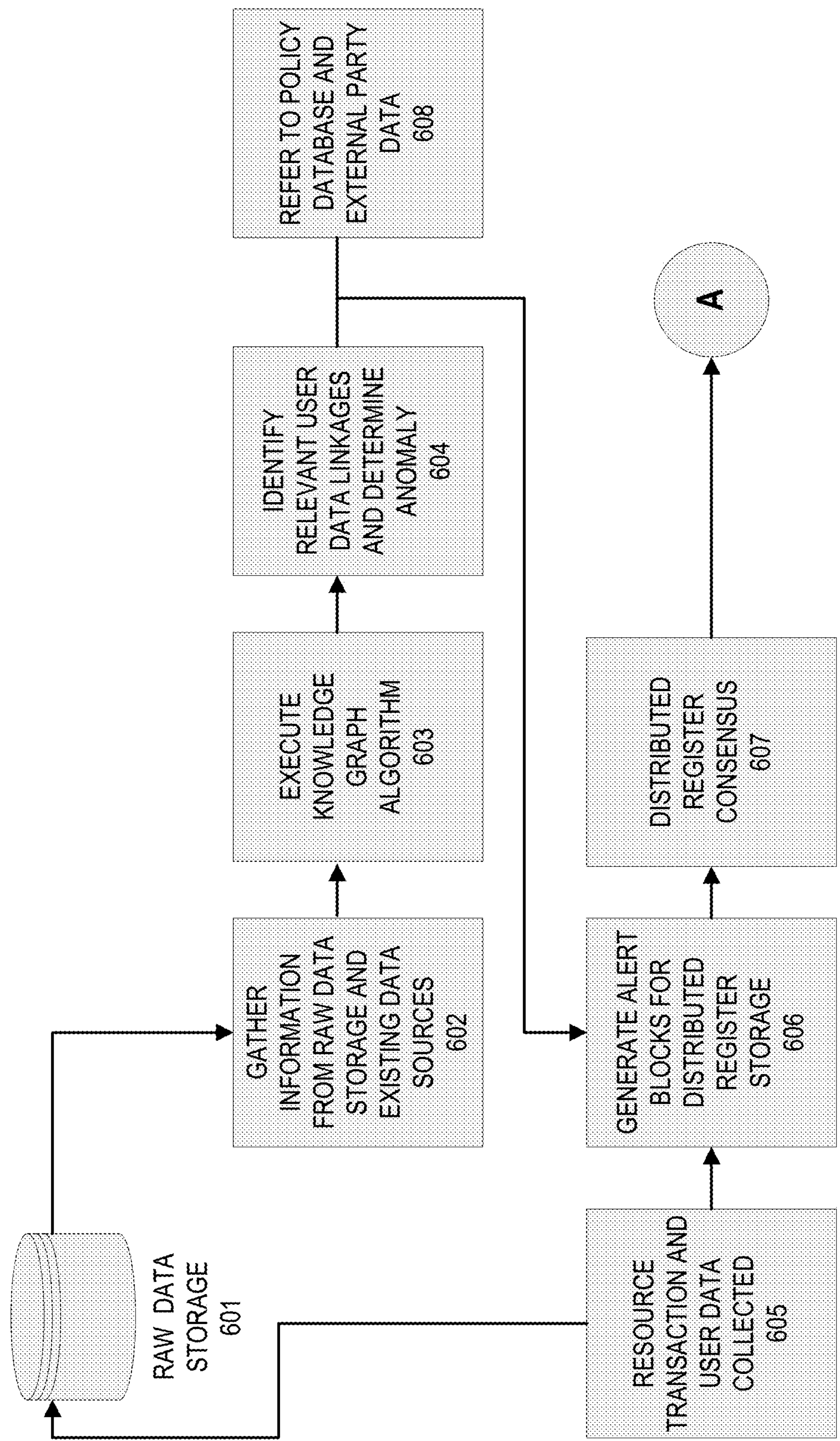
Figure 6B:
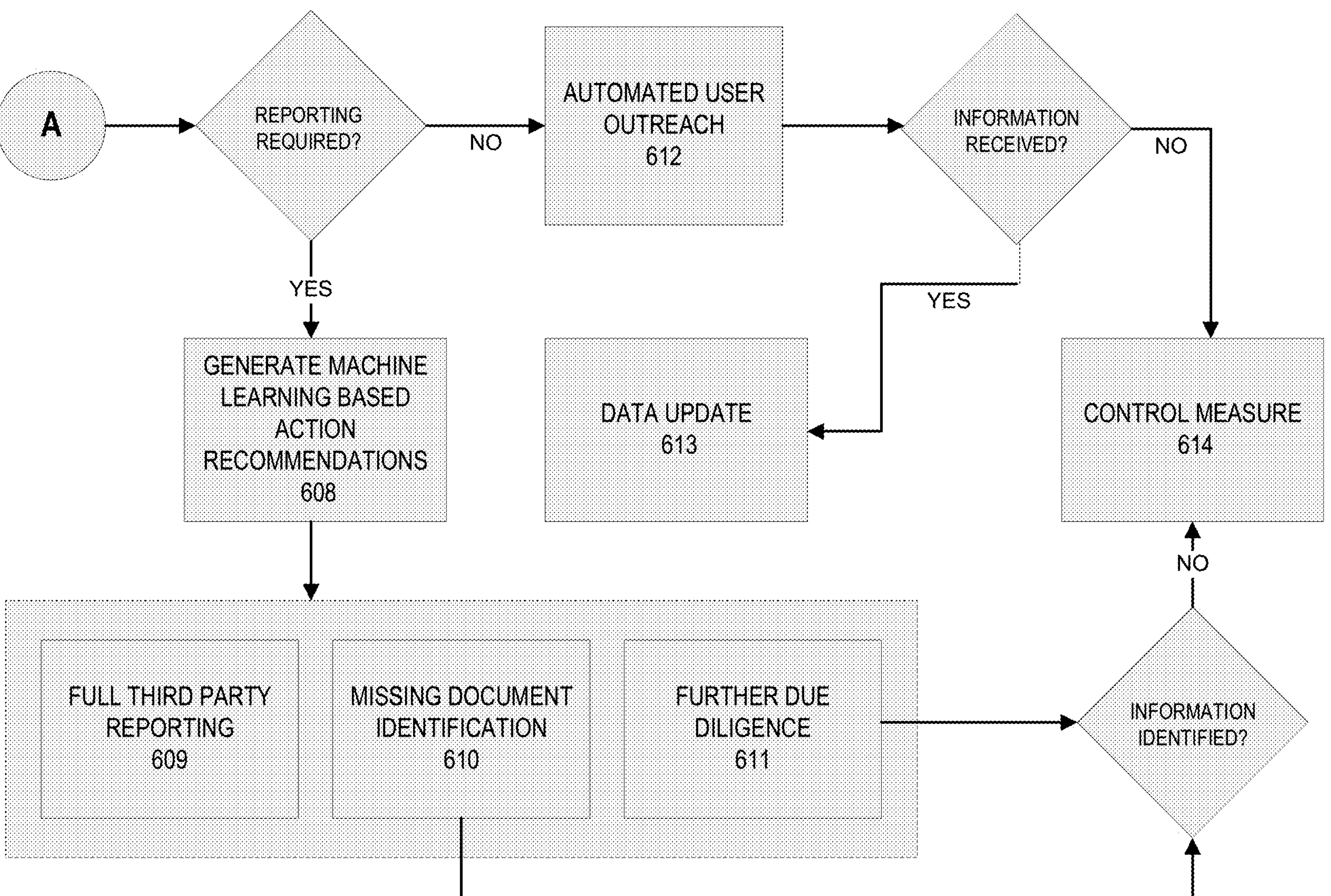
Figure 7:
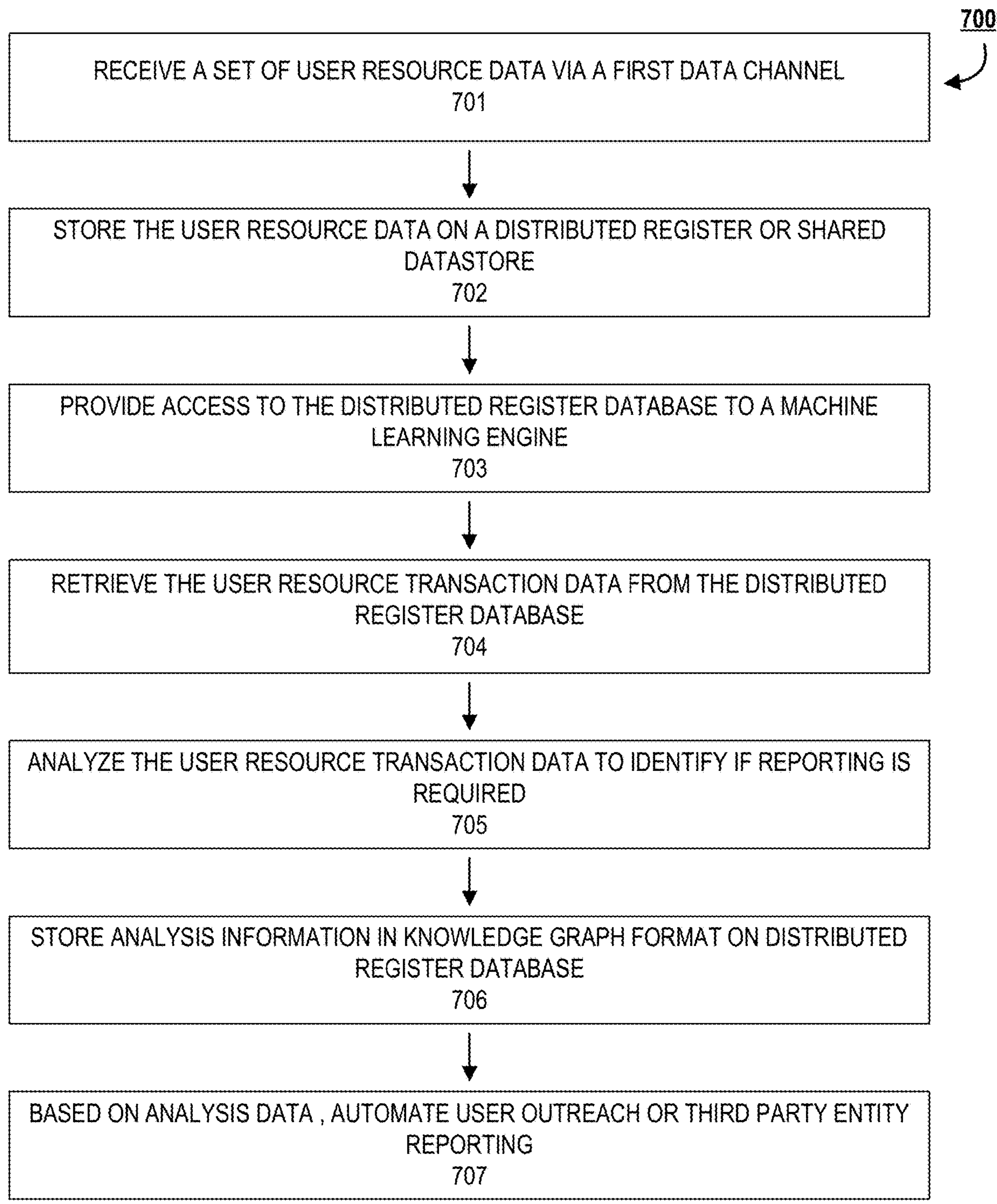

Having thus described embodiments of the invention in general terms, reference will now be made to the accompanying drawings, wherein:

FIG. 1 depicts a system environment 100 providing a system for multi-channel user input, in accordance with one embodiment of the present invention;

FIG. 2 provides a block diagram of the user device 104, in accordance with one embodiment of the invention;

FIG. 3 is a block diagram illustrating an operating environment for the distributed trust computing network 200, in accordance with some embodiments of the invention;

FIG. 4 is a block diagram illustrating the data flow between the structures of the data monitoring system, one or more nodes, and one or more entity systems, in accordance with some embodiments of the present disclosure;

FIG. 5 is a block diagram illustrating the data structures within the distributed register, in accordance with some embodiments of the invention;

FIG. 6*a* depicts a process flow for augmented user data collection and secure storage, in accordance with one embodiment of the present invention;

FIG. 6*b* depicts a process flow for response to data analysis and secure storage, in accordance with one embodiment of the present invention; and FIG. 7 depicts a high-level process flow 700 for data integrity monitoring and securitization, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user datastore that includes only personal information associated with the user, or the like. The technology resource or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface that facilitates communication using one or more communication mediums such as tactile communication (such, as communication via a touch screen, keyboard, and the like), audio communication, textual communication and/or video communication (such as, gestures). Typically, a graphical user interface (GUI) of the present invention is a type of interface that allows users to interact with electronic elements/devices such as graphical icons and visual indicators such as secondary notation, as opposed to using only text via the command line. That said, the graphical user interfaces are typically configured for audio, visual and/or textual communication, and are configured to receive input and/or provide output using one or more user device components and/or external auxiliary/peripheral devices such as a display, a speaker, a microphone, a touch screen, a camera, a GPS device, a keypad, a mouse, and/or the like. In some embodiments, the graphical user interface may include both graphical elements and text elements. The graphical user interface is configured to be presented on one or more display devices associated with user devices, entity systems, auxiliary user devices, processing systems and the like.

An electronic activity, also referred to as a "technology activity" or a "user activity", such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: transfer of resources/funds between financial accounts (also referred to as "resources"), deposit of resources/funds into a financial account or resource (for example, depositing a check), withdrawal of resources or finds from a financial account, a sale of goods and/or services, initiating an automated teller machine (ATM) or online banking session, an account balance inquiry, a rewards transfer, opening a bank application on a user's computer or mobile device, a user accessing their e-wallet, applying one or more promotions/coupons to purchases, or any other interaction involving the user and/or the user's device that invokes or that is detectable by or associated with the financial institution. A resource transfer may also include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer," a "transaction," a "transaction event," or a "point of transaction event," refers to any user activity (financial or non-financial activity) initiated between a user and a resource entity (such as a merchant), between the user and the financial instruction, or any combination thereof.

In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a funds/resource transfer between account, funds/resource transfer as a payment for the purchase for a product, service, or the like from a merchant, and the like. Typical financial transactions or resource transfers include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a merchant or the like, who utilizes an external apparatus such as a user device, for retrieving information related to the user's business that the entity may maintain or compile. Such information related to the user's business may be related to resource transfers or transactions that other users have completed using the entity systems. The external apparatus may be a user device (computing devices, mobile devices, smartphones, wearable devices, and the like). In some embodiments, the user may seek to perform one or more user activities using a multi-channel cognitive resource application of the invention, or user application, which is stored on a user device. In some embodiments, the user may perform a query by initiating a request for information from the entity using the user device to interface with the system for adjustment of resource allocation based on multi-channel inputs in order to obtain information relevant to the user's business.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

FIG. 1 depicts a platform environment 100 providing a system for multi-channel input and analysis, in accordance with one embodiment of the present invention. As illustrated in FIG. 1, a data monitoring system 106, configured for providing an intelligent, proactive and responsive application or system, at a user device 104, which facilitates execution of electronic activities in an integrated manner. The resource technology system is operatively coupled, via a network 101 to one or more user devices 104, auxiliary user devices 170, to entity systems 180, distributed register 250, third party systems 160, and other external systems/third-party servers not illustrated herein. In this way, the data monitoring system 106 can send information to and receive information from multiple user devices 104 and auxiliary user devices 170 to provide an integrated platform with multi-channel communication capabilities to a user 102, and particularly to the user device 104. At least a portion of the system is typically configured to reside on the user device 104, on the data monitoring system 106 (for example, at the system application 144), and/or on other devices and system and is an intelligent, proactive, responsive system that facilitates analysis and secure storage of information.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the auxiliary user devices 170, (for example, based on reeving a user input, or when the user device 104 is within a predetermined proximity or broadcast range of the auxiliary user device(s) 170), as illustrated by communication channel 101*a*. Therefore, the system, via the network 101 may establish, operative connections between otherwise incompatible devices, for example by establishing a communication channel 101*a* between the one or more user devices 104 and the auxiliary user devices 170. In this regard, the network 101 (and particularly the communication channels 101*a*) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the auxiliary user device 170 or it may include only waving or holding the external apparatus near an appropriate portion of the auxiliary user device without making physical contact with the auxiliary user device.

In some embodiments, the user 102 is an individual that wishes to conduct one or more activities with data monitoring system 106 using the user device 104. In some embodiments, the user 102 may access the data monitoring system 106, and/or the entity system 180 through a user interface comprising a webpage or a user application. Hereinafter, "user application" is used to refer to an application on the user device 104 of the user 102, a widget, a webpage accessed through a browser, and the like. As such, in some instances, the user device may have multiple user applications stored/installed on the user device 104. In some embodiments, the user application is a user application 538, also referred to as a "user application" herein, provided by and stored on the user device 104 by the data monitoring system 106. In some embodiments the user application 538 may refer to a third party application or a user application stored on a cloud used to access the data monitoring system 106 and/or the auxiliary user device 170 through the network 101, communicate with or receive and interpret signals from auxiliary user devices 170, and the like. In some embodiments, the user application is stored on the memory device of the data monitoring system 106, and the user interface is presented on a display device of the user device 104, while in other embodiments, the user application is stored on the user device 104. It is understood that the one or more auxiliary user devices 170 may be used to further gather relevant data for the data monitoring system 106 to use in analysis and storage functions. For instance, relevant data collected from auxiliary user devices 170 may further inform the system of a user's identity, relationships to other users, or the like.

The user 102 may subsequently navigate through the interface or initiate one or more user activities or resource transfers using a central user interface provided by the user application 538 of the user device 104. In some embodiments, the user 102 may be routed to a particular destination or entity location using the user device 104. In some embodiments the auxiliary user device 170 requests and/or receives additional information from the data monitoring system 106/the third party systems 160 and/or the user device 104 for authenticating the user and/or the user device, determining appropriate queues, executing information queries, and other functions. FIG. 2 provides a more in depth illustration of the user device 104.

As further illustrated in FIG. 1, the data monitoring system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the third party systems 160, auxiliary user devices 170 and/or the user device 104. As such, the communication device 136 generally comprises a modem, server, wireless transmitters or other devices for communicating with devices on the network 101. The memory device 140 typically comprises a non-transitory computer readable storage medium, comprising computer readable/executable instructions/code, such as the computer-readable instructions 142, as described below.

As further illustrated in FIG. 1, the data monitoring system 106 comprises computer-readable instructions 142 or computer readable program code 142 stored in the memory device 140, which in one embodiment includes the computer-readable instructions 142 of a system application 144 (also referred to as a "system application" 144). The computer readable instructions 142, when executed by the processing device 138 are configured to cause the system 106/processing device 138 to perform one or more steps described in this disclosure to cause out systems/devices to perform one or more steps described herein. In some embodiments, the memory device 140 includes a data storage for storing data related to user transactions and resource entity information, but not limited to data created and/or used by the system application 144. Data monitoring system 106 also includes machine learning engine 146. In some embodiments, the machine learning engine 146 is used to analyze received data in order to identify complex patterns and intelligently improve the efficiency and capability of the data monitoring system 106 to analyze received voice print data and identify unique patterns. In some embodiments, the machine learning engine 146 is used to analyze received data in order to identify and recommend further action for reporting, due diligence, information gathering, or the like. In some embodiments, the machine learning engine 146 may include supervised learning techniques, unsupervised learning techniques, or a combination of multiple machine learning models that combine supervised and unsupervised learning techniques. In some embodiments, the machine learning engine may include an adversarial neural network that uses a process of encoding and decoding in order to adversarial train one or more machine learning models to identify relevant patterns in received data received from one or more channels of communication.

FIG. 1 further illustrates one or more auxiliary user devices 170, in communication with the network 101. The auxiliary user devices 170 may comprise peripheral devices such as speakers, microphones, smart speakers, and the like, display devices, a desktop personal computer, a mobile system, such as a cellular phone, smart phone, personal data assistant (PDA), laptop, wearable device, a smart TV, a smart speaker, a home automation hub, augmented/virtual reality devices, or the like.

In the embodiment illustrated in FIG. 1, and described throughout much of this specification, a "system" configured for performing one or more steps described herein refers to the services provided to the user via the user application, that may perform one or more user activities either alone or in conjunction with the data monitoring system 106, and specifically, the system application 144, one or more auxiliary user device 170, and the like in order to provide an intelligent system for data analysis, storage, and monitoring.

Also pictured in FIG. 1 are one or more third party systems 160, which are operatively connected to the data monitoring system 106 via network 101 in order to transmit data associated with user activities, user authentication, user verification, resource actions, and the like. For instance, the capabilities of the data monitoring system 106 may be leveraged in some embodiments by third party systems in order to authenticate user actions based on data provided by the third party systems 160, third party applications running on the user device 104 or auxiliary user devices 170, as analyzed and compared to data stored by the data monitoring system 106, such as data stored in the distributed register 250 or stored at entity systems 180. In some embodiments, the data storage and processing capabilities of data monitoring system 106 may be provided as a service by the data monitoring system 106 to the entity systems 180, third party systems 160, or additional systems and servers not pictured, through the use of an application programming interface ("API") designed to simplify the communication protocol for client-side requests for data or services from the data monitoring system 106. In this way, the capabilities offered by the present invention may be leveraged by multiple parties other than the those controlling the data monitoring system 106 or entity systems 180. In other embodiments, the third party systems 160 may be provided permissioned access to data of the data monitoring system 106 via a password protected web interface, password protected link, permissioned access to portions of the distributed register 250, or a link to certain encrypted information on the distributed register 250 which can be decrypted or contextualized at a later time.

FIG. 2 provides a block diagram of the user device 104, in accordance with one embodiment of the invention. The user device 104 may generally include a processing device or processor 502 communicably coupled to devices such as, a memory device 534, user output devices 518 (for example, a user display device 520, or a speaker 522), user input devices 514 (such as a microphone, keypad, touchpad, touch screen, and the like), a communication device or network interface device 524, a power source 544, a clock or other timer 546, a visual capture device such as a camera 516, a positioning system device 542, such as a geo-positioning system device like a GPS device, an accelerometer, and the like. The processing device 502 may further include a central processing unit 504, input/output (I/O) port controllers 506, a graphics controller or graphics processing device (GPU) 208, a serial bus controller 510 and a memory and local bus controller 512.

The processing device 502 may include functionality to operate one or more software programs or applications, which may be stored in the memory device 534. For example, the processing device 502 may be capable of operating applications such as the multi-channel resource application. The user application 538 may then allow the user device 104 to transmit and receive data and instructions from the other devices and systems of the environment 100. The user device 104 comprises computer-readable instructions 536 and data storage 540 stored in the memory device 534, which in one embodiment includes the computer-readable instructions 536 of a multi-channel resource application. In some embodiments, the user application 538 allows a user 102 to access and/or interact with other systems such as the entity system 180, third party system 160, or data monitoring system 106. In one embodiment, the user 102 is a maintaining entity of a data monitoring system 106, wherein the user application enables the user 102 to configure the data monitoring system 106 or its components. In one embodiment, the user 102 is a customer of a financial entity and the user application 538 is an online banking application providing access to the entity system 180 wherein the user may interact with a resource account via a user interface of the multi-channel resource application, wherein the user interactions may be provided in a data stream as an input via multiple channels. In some embodiments, the user 102 may a customer of third party system 160 that requires the use or capabilities of the data monitoring system 106 for authorization or verification purposes.

The processing device 502 may be configured to use the communication device 524 to communicate with one or more other devices on a network 101 such as, but not limited to the entity system 180 and the data monitoring system 106. In this regard, the communication device 524 may include an antenna 526 operatively coupled to a transmitter 528 and a receiver 530 (together a "transceiver"), modem 532. The processing device 502 may be configured to provide signals to and receive signals from the transmitter 528 and receiver 530, respectively. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols or the like. For example, the user device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, millimeter wave technology communication protocols, and/or the like. The user device 104 may also be configured to operate in accordance with non-cellular communication mechanisms, such as via a wireless local area network (WLAN) or other communication/data networks. The user device 104 may also be configured to operate in accordance with an audio frequency, ultrasound frequency, or other communication/data networks.

The user device 104 may also include a memory buffer, cache memory or temporary memory device operatively coupled to the processing device 502. Typically, one or more applications, are loaded into the temporarily memory during use. As used herein, memory may include any computer readable medium configured to store data, code, or other information. The memory device 534 may include volatile memory, such as volatile Random Access Memory (RAM) including a cache area for the temporary storage of data. The memory device 534 may also include non-volatile memory, which can be embedded and/or may be removable. The non-volatile memory may additionally or alternatively include an electrically erasable programmable read-only memory (EEPROM), flash memory or the like.

Though not shown in detail, the system further includes one or more entity systems 180 which is connected to the user device 104 and the data monitoring system 106 and which may be associated with one or more entities, institutions, third party systems 160, or the like. In this way, while only one entity system 180 is illustrated in FIG. 1, it is understood that multiple networked systems may make up the system environment 100. The entity system 180 generally comprises a communication device, a processing device, and a memory device. The entity system 180 comprises computer-readable instructions stored in the memory device, which in one embodiment includes the computer-readable instructions of an entity application. The entity system 180 may communicate with the user device 104 and the data monitoring system 106 to provide access to user accounts stored and maintained on the entity system 180. In some embodiments, the entity system 180 may communicate with the data monitoring system 106 during an interaction with a user 102 in real-time, wherein user interactions may be logged and processed by the data monitoring system 106 in order to analyze interactions with the user 102 and reconfigure the machine learning model in response to changes in a received or logged data stream. In one embodiment, the system is configured to receive data for decisioning, wherein the received data is processed and analyzed by the machine learning model to determine a conclusion.

FIG. 3 is a block diagram illustrating an operating environment for the distributed trust computing network 200, in accordance with some embodiments of the present disclosure. In particular, the operating environment may include a plurality of distributed register nodes 201, 202, 203, 204 in operative communication with one another within the distributed trust computing network 200. The distributed trust computing network 200, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 201, the second distributed register node 202, the third distributed register node 203, and the fourth distributed register node 204 may be computing systems which host the distributed register 250. In some embodiments, the distributed register 250 may comprise the data for all resources within the entity system. Accordingly, the distributed register nodes 201, 202, 203, 204 are typically networked terminals or servers, but may also be desktop computers, laptops, smartphones or smart devices, IoT devices, or the like, or any combination thereof. Typically, each distributed register node 201, 202, 203, 204 hosts a complete copy of the distributed register 250. The contents of the various copies of the distributed register 250 hosted on the distributed register nodes 201, 202, 203, 204 may be updated to be consistent with one another via a consensus algorithm executed by the distributed register nodes 201, 202, 203, 204. In this way, a complete and verified copy of the distributed register 250 may remain accessible even if the copy of the distributed register 250 stored on one or more distributed register nodes 201, 202, 203, 204 become inaccessible (e.g., due to being offline, experiencing high network latency, or the like) or corrupted (e.g., due to hardware/software errors, unauthorized modification of distributed register contents, or the like). It is understood that while four nodes are depicted in the embodiment shown in FIG. 3, there may be any number of nodes ("N" number of nodes) which make up the distributed trust computing network 200 and operate to validate entries and maintain a complete copy of the distributed register 250.

The operating environment may further comprise the data monitoring system 106 which may be in operative communication with the distributed register nodes 201, 202, 203, 204 of the distributed trust computing network 200. The data monitoring system 106 may be a computing system that submits data to the nodes 201, 202, 203, 204 in the form of proposed data records to be added to the distributed register 250. The data monitoring system 106 may further be used to manage interjectors and receive notifications regarding the data within the distributed register 250. Accordingly, the data monitoring system 106 may be one or more desktop computers, laptop computers, smartphones, tablets, smart devices, IoT devices, single board computers, or the like. In some embodiments, data monitoring system 106 may be operated by a user within the entity. In other embodiments, the data monitoring system 106 may automatically perform various functions to manage submitted or retrieved data or interjectors.

The submission and receipt of data between data monitoring system 106 and the distributed trust computing network 200 may be achieved through one or more nodes described in FIG. 1 (e.g., the node 1, the node 2, or the like) and immediately processed for submission to the distributed register, such that that data hops or manual data touchpoints are reduced to preferably zero, allowing the system to maintain maximum integrity of data validation. The automated flow of permissioned ledger data allows the leveraging of distributed register technology and distributed register based services directly to entity side systems. The data monitoring system 106 may be designed to provide access to data stored on the distributed register to third party systems as well. For instance, the third party system may comprise an overseeing entity conducting an investigation or study of data history or patterns within the data stored on the distributed register.

It should be understood by those having ordinary skill in the art that although the distributed register nodes 201, 202, 203, 204, and/or the data monitoring system 106 are depicted as single units, each of the depicted components, or sub-components therein, may represent multiple units. In some embodiments, a given computing system as depicted in FIG. 3 may represent multiple systems configured to operate in a distributed fashion. In other embodiments, the functions of multiple computing systems may be accomplished by a single system. For instance, the functions of the data monitoring system 106 may be accomplished by one or more of the distributed register nodes 201, 202, 203, 204. It should further be understood that even though reference may be made to a single "distributed trust computing network 200," all singular usages of "distributed trust computing network" or "distributed register" may also refer to multiple distributed registers. For instance, separate distributed registers may be stored on the nodes 201, 202, 203, 204 on a per-application or per-parameter basis.

FIG. 4 is a block diagram illustrating the data flow between the structures of the data monitoring system 106, one or more nodes, and one or more entity systems, in accordance with some embodiments of the present disclosure. The node N system 301 may comprise a processor 221 communicably coupled to such devices as a communication interface 211 and a memory 231. It should be understood that the node N system 301 as depicted in FIG. 4 may represent any or all of the distributed register nodes 201, 202, 203, 204 as depicted in FIG. 3. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The node N system 301 may use the communication interface 211 to communicate with other devices over the distributed trust computing network 200 or over network 100. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the node N system 301 may comprise a copy of the distributed register 250. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory, solid state memory, or the like. In some embodiments, the memory 231 of the node N system 301 may further comprise smart contract logic for one or more interjectors.

Typically, the node N system 301, along with any or all nodes within the distributed trust computing network 200, maintain a complete copy of the distributed register 250. The node N system 301 may be configured to communicate with the other nodes to determine the contents of the distributed register 250 stored thereon. For instance, the nodes within the distributed trust computing network 200 may use one or more consensus algorithms (e.g., Proof-of-Work, Proof-of-Stake, Practical Byzantine Fault Tolerance, or the like) to add proposed data records to each of the individual copies of the distributed register 250. In other embodiments, the nodes 201, 202, 203, and 204 may execute smart contract logic to add proposed data records.

As discussed in FIG. 1, the data monitoring system 106 may also comprise a processing device 138 communicatively coupled with such devices as a communication device 136 and a memory device 140. Typically, the data monitoring system 106 interacts with the node N system 301 to access the distributed register 250 therein. Accordingly, the data monitoring system 106 may be a desktop computer, networked terminal, laptop computer, tablet, smartphone, or the like. In embodiments in which the data monitoring system 106 is operated by a user, the assessments computing system 110 may be configured to interface with the user, who may use the data monitoring system 106 to access the access, view, and/or submit proposed data records within the distributed register 250. The data monitoring system 106 may further be used to manage the distributed register interjectors. In this regard, the data monitoring system 106 may further comprise a user interface 252, which may comprise the hardware and software implements to accept input from and provide output to the user. The user interface 252 may comprise hardware such as a display, audio output devices, projectors, or the like, or input devices such as keyboards, mice, sensors, cameras, microphones, biometric input devices (e.g., fingerprint readers), or the like. The user interface 252 may further comprise software such as a graphical or command-line interface through which the user may provide inputs and/or receive outputs from the data monitoring system 106. It should be understood that the display on which the user interface 252 is presented may include an integrated display (e.g. a tablet or smartphone screen) within the data monitoring system 106, or an external display device (e.g. a computer monitor or television).

The memory device 140 of the data monitoring system 106 may comprise a distributed register application 17 stored thereon. The distributed register application 17 may include software that allows the data monitoring system 106 to submit proposed data records to the distributed register 250, where the proposed data records comprise resource account data or pooled resource account data. In some embodiments, the data monitoring system 106 may automatically submit resource account data to the distributed register 250. In such embodiments, the distributed register application 17 may be configured to upload data to the node N system 301 upon being prompted by a distributed register interjector. In other embodiments, a user may use the data monitoring system 106 to upload data and/or participate in consensus to validate proposed data records via a selected path or specific node on distributed trust computing network 200. In such embodiments, the distributed register application 17 may include an entity-provided application or other third party application which interfaces with the user to allow the user to intelligently select and communicate with the node N system 301. For instance, in some embodiments, the distributed register application 17 may include a web browser, web portal, API interface, or the like which allows the user to access a web server to upload data, send or receive data, participate in validation of data records, manage distributed register interjectors, or the like. In certain embodiments, the distributed register application 17 may further comprise distributed register interjectors which prompt the addition or update of data within the distributed register 250.

The node N system 301 and/or the data monitoring system 106 may further be in operative communication with one or more entity systems, such as entity N system 302. The entity N system 302 may comprise a communication interface 213, a processor 223, and a memory 233 having a data store 243 stored thereon. The data store 243 may comprise the types of data needed by the data monitoring system 106 to perform data path selection management or data storage management. For example, the data store 243 may comprise a continuously updated list of application information, latency requirements, data schema, historical processing times, transaction types, backup configurations, or may comprise a continuously updated list of entity policies. Based on the data store 243, the data monitoring system 106 may define new parameters or update existing parameters for specific applications or data sets.

FIG. 5 is a block diagram illustrating the data structures within the distributed register 250, in accordance with some embodiments of the invention. In particular, FIG. 5 depicts a plurality of entries 300, 301 within the distributed register 250, in addition to a proposed entry 302 that has been submitted to be appended to the distributed register 250. The distributed register 250 may comprise a genesis entry 300 that serves as the first entry and origin for subsequent entries in the distributed register 250. The genesis entry 300, like all other entries within the distributed register 250, comprise entry header 301 and entry data 309. The genesis entry data 309, or any other instances of entry data any entries in the distributed register 250 may contain various data records.

The genesis entry header 301 may comprise various types of metadata regarding the genesis entry data 309. In some embodiments, the entry header 311 may comprise a genesis entry root hash 303, which is a hash derived from an algorithm using the genesis entry data 309 as inputs. In some embodiments, the genesis root hash 303 may be a Merkle root hash, wherein the genesis entry root hash 303 is calculated via a hash algorithm based on a combination of the hashes of each data record within the genesis entry data 309. In this way, any changes to the data within the genesis entry data 309 will result in a change in the genesis entry root hash 303. The genesis entry header 301 may further comprise a genesis entry timestamp 304 that indicates the time at which the entry was written to the distributed register 250. In some embodiments, the timestamp may be a Unix timestamp. In some embodiments, particularly in distributed registers utilizing a proof-of-work ("PoW") consensus mechanism, the entry header 301 may comprise a nonce value and a difficulty value. The nonce value may be a whole number value that, when combined with a hash of the other items of metadata within the entry header 301, produces a hash output that satisfies the difficulty level of the cryptographic puzzle as defined by the difficulty value. For instance, the consensus mechanism may require that the resulting hash of the entry header 301 falls below a certain value threshold (e.g., the hash value must start with a certain number of zeroes, as defined by the difficulty value).

A subsequent entry 301 may be appended to the genesis entry 300 to serve as the next entry in the distributed register. Like all other entries, the entry 300 comprises an entry header 311 and entry data 319. Similarly, the entry header 311 comprise an entry root hash 313 of the data within the entry data 319 and an entry timestamp 314. The entry header 311 may further comprise a previous entry pointer 312, which may be a hash calculated by combining the hashes of the metadata (e.g., the genesis entry root hash 303, genesis entry timestamp 304, or the like) within the entry header 301 of the genesis entry 300. In this way, the entry pointer 312 may be used to identify the previous entry (i.e., the genesis entry 300) in the distributed register 250, thereby creating a "chain" comprising the genesis entry 300 and the entry 301.

The value of a previous entry pointer is dependent on the hashes of the entry headers of all of the previous entries in the chain; if the entry data within any of the entries is altered, the entry header for the altered entry as well as all subsequent entries will result in different hash values. In other words, the hash in the entry header may not match the hash of the values within the entry data, which may cause subsequent validation checks to fail. Even if an unauthorized user were to change the entry header hash to reflect the altered entry data, this would in turn change the hash values of the previous entry pointers of the next entry in the sequence. Therefore, an unauthorized user who wishes to alter a data record within a particular entry must also alter the hashes of all of the subsequent entries in the chain in order for the altered copy of the distributed register to pass the validation checks imposed by the consensus algorithm. Thus, the computational impracticability of altering data records in a distributed register in turn greatly reduces the potential of improper alteration of data records.

A pending entry 302 or "proposed entry" may be submitted for addition to the distributed register 250. The pending entry 302 may comprise a pending entry header 321, which may comprise a pending entry root hash 323, a previous entry pointer 322 that points to the previous entry 301, a pending entry timestamp 324, and pending entry data 329. Once a pending entry 302 is submitted to the system, the nodes within the system may validate the pending entry 302 via a consensus algorithm. The consensus algorithm may be, for instance, a proof of work mechanism, in which a node determines a nonce value that, when combined with a hash of the entry header 311 of the last entry in the distributed register, produces a hash value that falls under a specified threshold value. For instance, the PoW algorithm may require that said hash value begins with a certain number of zeroes. Once said nonce value is determined by one of the nodes in the distributed register, the node may post the "solution" to the other nodes in the distributed register. Once the solution is validated by the other nodes, the hash of the entry header 311 is included in the pending entry header 321 of the pending entry 302 as the previous entry pointer 322. The pending entry header 321 may further comprise the pending entry root hash 323 of the pending entry data 329 which may be calculated based on the winning solution. The pending entry 302 is subsequently considered to be appended to the previous entry 301 and becomes a part of the distributed register 250. A pending entry timestamp 324 may also be added to signify the time at which the pending entry 302 is added to the distributed register 250. In other embodiments, the consensus mechanism may be based on a total number of confirmations submitted by the nodes of the distributed register 250 (e.g., a PBFT consensus mechanism). Once a threshold number of confirmations to validate the pending entry 302 has been reached, the pending entry 302 may be appended to the distributed register 250. In such embodiments, nonce values and difficulty values may be absent from the entry headers.

The system described herein may use one of several different paradigms for entry creation. In some embodiments, an entry may be generated whenever new assessment parameters or applications are defined. In some embodiments, the system may wait to receive inputs for all known assessment parameters for all applications before generating an entry. In other embodiments, entries may be generated on a per-application basis. In yet other embodiments, new entries may be generated for each transaction that is processed or routed by the data monitoring system 106. Other possibilities exist, as the entity may select its entry generation methods based on striking a balance between computing efficiency and detailed record keeping over a period of time.

The resource account system, via the distributed register application 17, may submit a proposed data record to the distributed register 250, where the proposed data record may comprise a new or updated assessment parameter, resource data, new or updated metadata regarding a resource, or the like. In this way, the distributed register application 17 may be used to manage data, account parameters, assessment data, or the like. Furthermore, because such data is added in time-stamped entries to the distributed register, the system is able to reliably and accurately recreate the state of the resources) within the entity system at any particular point in time.

The data records may comprise resource account data, application data, user data, social media data, or resource agreement data associated with one or more applications, users, relationships between users, or the like. In particular, each account or user within the entity system may be assigned an identifier (e.g., a character string, hash value, numerical identifier, or the like). For instance, in some embodiments, accounts may be labeled in numerical order (e.g., account 1, account 2, or the like). In other embodiments, the accounts may be logged according to an existing resource identifier, such as an account number, user identifier, pin code, wallet address, routing number, social media identifier, user handle, combination of identifiers, or the like. In further embodiments, an existing account number may be logged as associated with a separate account identifier that is used to log data in the distributed register (e.g., account number 1 associated with user 1, or account number 1 associated with application 1, or the like). The parameters used to log each account may also each be assigned a parameter identifier. For instance, the parameters may be numbered (e.g., Parameter 1, Parameter 2, or the like). Parameters may include, but are not limited to, tracking each particular account's amount, application's needs, application's compatibilities, ownership information, security information, resource transaction information, user interaction information, managing entity information, jurisdiction, or the like.

In any embodiment, the data monitoring system 106 may, via the distributed register application 17, participate in validating proposed data records through a consensus algorithm, along with the nodes of the distributed register 250. For example, a new parameter which coincides with a newly created account update, resource transaction, user interaction, identified user relationship, or the like, may be proposed to be added to the distributed register 250. In such embodiments, the data monitoring system 106 may be used to verify that the new application update adequately and accurately reflects the code in the component applications. The data monitoring system 106 may further ensure that the data to be entered possesses certain latency requirements, data file type requirements, or historical processing time, or the like. For instance, the system may receive data from data sources on a periodic basis that is not relatively time-sensitive and does not possess any specific latency requirements (e.g., data monitoring system 106 may ping one or more entity systems to receive an updated resource account balance once per day). If the required parameters are missing or cannot be corroborated from the received data, the data monitoring system 106 may either reject the proposed data record containing the data or delay validating the proposed data record until the missing inputs are provided. In other embodiments, the system may receive data from data sources on a periodic basis that is relatively time-sensitive and does possess specific latency requirements (e.g., data monitoring system 106 may ping one or more entity systems to receive real time market value of resources, or the like). In this case, the data monitoring system 106 may prioritize the data path of a node with the lowest latency for this specific data.

In some embodiments, the distributed register application 17 of the data monitoring system 106 may be used to define an initial set of parameters within the entry data (e.g., the genesis entry data 309) of an entry (e.g., the genesis entry 300) for each resource in the entity system. In such embodiments, when the data monitoring system 106 submits proposed data records to be appended to the distributed register 250 in subsequent entries, the consensus algorithm may require that a parameter and resource has been defined in one of the previous entries in order for the proposed data record to be considered valid. For instance, if a proposed data record comprises an assessment for Resource Parameter 1 with respect to Resource 1, the system may first verify that the Resource Parameter 1 and Resource 1 have been defined in a previous entry (e.g., the genesis entry 300). If the definitions of the parameter and resource are not found, the proposed data record may be considered to be invalid. It should be noted that while parameters may be defined in the genesis entry 300, it is within the scope of the disclosure for new or updated parameters and/or resources to be defined in any entry within the distributed register 250.

Over time, it may become necessary to adjust these processes in response to changes in the operating environment, entity requirements, technical advances, new security issues, changes in policies, or the like. In this regard, the system may use one or more interjectors 330 to cause a new entry to be created which contains the new tracking parameters, data, and/or metadata. "Interjector" may generally refer to the hardware and software implements that trigger the addition or updating of data within a new entry (e.g., the pending entry 302). In some embodiments, the interjector may be stored on the data monitoring system 106. In other embodiments, the interjectors may be executed as smart contracts by the nodes of the distributed register 250.

An interjector 330 may detect the existence of a condition that requires a change in the metadata, transaction data, or other type of data within the distributed register 250. For example, the "condition" may be the emergence of a new type of behavior pattern, resource transaction pattern, flagged account suspicion, or security vulnerability which necessitates the evaluation of particular accounts, users, resource channels, or applications to assess their vulnerability or loss potential. Upon detecting the condition, the interjector 330 may trigger the addition of new data records to the distributed register 250 via the distributed register application 17 in order to restrict willful attempts at altering or masking such data. In some embodiments, the system may recognize that further information is available regarding a previously entered data point, and may automatically request such data from one or more entities or users, and may refer back to a previously added data block via a work queue in order to enhance historical data with new information and context (e.g., a block entry number "N" may be added and appended a hash value of any number of alphanumerical characters, wherein certain characters, such as the last 2 characters of a hash string may indicate a particular work queue). In this way, the data stored on the distributed register may be updated or expanded upon, but not overwritten, corrupted, or tampered with. As such, the system provides integrity, continuity, and security of data beyond that of conventional data storage or database systems.

In embodiments in which the new data records are added manually, the interjector 330 may send an alert or notification to the user through the data monitoring system 106, where the alert or notification prompts the user to enter the necessary information (e.g., a renewed assessment, a new account parameter, identified user relationship, or the like). The alert or notification may comprise a link (e.g., a hyperlink, or the like) that, when activated, opens a graphical interface on data monitoring system 106 (e.g., a web browser pointing to a web server) which provides graphical elements that allow the user to input the necessary information (e.g., resource data, user data, account data, application data, network data, or the like). Once the user submits the necessary information, the data monitoring system 106 may submit a proposed data record to the distributed register 250, where the proposed data record contains the information provided by the user to be incorporated into the distributed register 250. In embodiments in which the new data records are added automatically, the interjector 330 may cause the data monitoring system 106 to automatically retrieve resource data and submit the necessary information to the distributed register 250 in the form of a proposed data record.

Various types of interjectors 330 may be used to trigger the addition of data records to the distributed register. For example, the interjectors 330 may include an "alert interjector" or a "reporting interjector" that triggers inputs of data relating to a newly identified security issue or user behavior anomaly, or the like. Furthermore, a "periodic interjector" may trigger reassessments after a threshold period of time has elapsed since a resource has last been assessed (e.g., periodically retrieving application data, account data, user data, or the like), a "circumstance interjector" which triggers data retrieval based on the occurrence of certain incidents, events, identified patterns, third party requests, potential issues, or the like. It should be understood that the interjectors 330 described above are provided for exemplary purposes only, and that other types of interjectors 330 and/or triggers may be used depending on the entity's needs.

FIG. 6*a* depicts a process flow for augmented user data collection and secure storage, in accordance with one embodiment of the present invention. As shown in FIG. 6*a*, data may be collected and stored as raw data storage 601. In some embodiments, the raw data storage 601 may be a remote database of cloud storage information which is made available to various system components for gathering and analysis. In some embodiments, the raw data storage may contain some metadata, such as source information, timestamp information, filetype information, encryption information, or the like. However, it is understood that the data stored in the raw data storage 601 may or may not be correlated with identified patterns or relationship data, which is further extrapolated and stored as verified information in the distributed register. Data may be sourced from any number of data sources, and may comprise resource transaction data (e.g., merchant information, originating and destination account information, routing information, or the like), various user data, such as user activity data, user social media data, user travel information, user relationship information (e.g., first degree, second degree, third degree contacts, or the like), resource account data, resource amount data, resource currency type, or the like. The collection of such data is indicated at block 605.

In some embodiments, certain raw data may be collected which triggers a rule-based alert. For instance, a resource transaction identified during data collection for a particular user over a certain resource amount may be flagged for automatic alert. It is understood that other alert triggers or thresholds may exist. For instance, a resource transaction with an entity flagged as a potential issue or known malfeasant actor may trigger the generation of an alert. In other embodiments, user data indicating a relationship with a separate user or entity which is known to be a potential security issue may trigger the creation of an alert. In any case where the resource transaction data or user data collected at block 605 meets such a threshold, the system may generate an alert block for distributed ledger storage at that time, as shown in block 606, such that the data is submitted as a pending entry for validation on the distributed register as entry data with a corresponding hash value, timestamp, and the like. In this way, the system ensures that the integrity of the alert data is ensured as soon as possible.

In some embodiments, the system may further identify relevant data for alert generation via gathering information from raw data storage and existing data sources, as shown in block 602, executing a knowledge graph algorithm, as shown in block 603, and analyzing the results of the knowledge graph algorithm in order to identify relevant user data linkages and determine anomalies, as shown in block 604. Such analysis may be performed in accordance with or informed by a policy database or external party data, as shown in block 608. For instance, certain anomalies, user relationships, resource transaction patterns, or the like, may not be apparent from raw data alone. However, by building and analyzing a knowledge graph of information to extrapolate potential relationship between data points and inferring their potential significance or observing patterns, a combination of resource transaction data or user data may rise to the level of warranting an alert generation for storage in the distributed register. For instance, a single resource transaction may not meet a threshold for alert generation in terms of resource amount, account destination, account source, or the like, but may be relevant to an overarching pattern of resource transactions which may be inferred as being related to the same purpose, security concern, or the like. For instance, a certain number of transactions just below a threshold amount for reporting requirements may be recognized as repeating from a certain resource account to a particular destination flagged as being potentially malfeasant, in which case the pattern of otherwise undetected resource transactions may indicate an intent to circumvent such reporting requirements, yet achieve the same desired result.

In other embodiments, a particular group of user accounts may be used to either send resources to or receive resources from a particular resource account. By nature of the relationship between the users, as identified by external user data, it may be inferred that the users are working in coordination with one another. In some embodiments, seemingly random amounts of resources transacted in multiple disparate transactions may collectively equate to certain amount above a given reporting threshold, in which case the users' concerted action may hold greater relevance than was initially apparent from the seemingly random, disparate transactions themselves. In this case, the knowledge graph may be used to identify the concerted effort of the group of users, and an alert may be generated as shown in block 606. In some embodiments, relevant patterns, thresholds, and relationships between users may be further informed by reference to a policy database or external party data provided by one or more third party entities. For instance, one or more third party entities, rule-propagating bodies, or the like, may maintain a list of policies, thresholds, users, resource accounts, or the like, which warrant the generation of an alert for further due diligence. By generating an alert and recording the identified data, relationships, patterns, anomalies, or the like, on the distributed register, the system ensures the integrity of the data against a willful attempt to corrupt the data or otherwise mask the identified anomaly, pattern, relationship, or the like. For instance, a user may attempt to gain access to the raw data storage 601 and corrupt, delete, change, or otherwise obfuscate certain data; however, the generated alerts and associated data stored on the distributed register would be immune to such actions by nature of the distributed manner in which data is validated in a consecutive fashion and hashed to create a remotely verifiable and auditable means of data storage.

It is understood that the generation of an "alert" does not necessarily constitute the generation of new data, but rather may indicate the storage of raw data, which in some embodiments may be stored on the distributed register along with appended metadata such as source, identified significance, identified relationships, patterns, or the like. While this data is immutably stored as a block entry in the distributed register and cannot be later altered, it may be updated by nature of the addition of data in other blocks, creating a verifiable trail of data history and updates as further information is obtained. As shown in block 607, generates alert blocks are appended to the distributed register shared across all nodes as the distributed register nodes form a consensus, as discussed in FIG. 3.

FIG. 6*b* depicts a process flow for response to data analysis and secure storage, in accordance with one embodiment of the present invention. As shown, FIG. 6*b* continues the process flow from point "A" of FIG. 6*a*. Once collected data, analysis, and generated alerts have been securely stored on the distributed register, the system may determine whether or not the alert constitutes a reporting requirement. For instance, the generated alert may comprise an alert of a resource transaction amount above a certain threshold amount which is required to be reported to a certain third party or entity. In this case, the process may continue to block 609, wherein the machine learning engine 146 may be employed to intelligently generate action recommendations depending on the nature of the alert data and the nature of the particular reporting requirement identified. In some embodiments, the machine learning model may generate a full third party reporting recommendation, as shown in block 610, a missing data or document identification alert, as shown in block 611, or a recommendation for further due diligence, as shown by block 612. In some embodiments, the machine learning engine 146 may identify based on the collected data or detected anomaly, pattern, relationship, or the like, that mandatory reporting of such identified data is required, in which case the recommendation for full third party reporting 610 may be implemented (e.g., anti-money laundering ("AML") requirements, know-your customer ("KYC") requirements, or the like). In other embodiments, the data may indicate resource transactions above a certain threshold, resource transactions or relationships with known malfeasant actors or which are otherwise relevant to ongoing inquiries by a third party entity, or the like, in which case the data may be automatically passed on to a particular party or entity (e.g., data may be automatically transferred, or otherwise made available to via access to the distributed register via distributed register application 17, to an entity such as FinCEN). In other embodiments, the machine learning engine may analyze previous reports and determine that certain information is still missing or follow-up diligence actions are outstanding such that a full report cannot be generated at the immediate time. In such instances, the machine learning engine 146 may recommend a missing document identification 610, or a further due diligence 611.

In further embodiments, the system may determine that reporting is not required at the immediate time that the alert is generated, and the process may instead proceed to other internal processes or follow up courses of action, such as block 613, automated user outreach. In some embodiments, the determination that reporting is not required may be based on a rule set managed by the entity systems 180, or data monitoring systems 106. In any case, the system may initiate an automated AML defect refresh in order to update data across one or more different platforms or accounts that may be affected by the identified alert, or to retrieve additional data that may be available that is relevant to the generated alert. Upon obtaining this data, the system may initiate a data update 613. In some embodiments, the additional data received (e.g., justification data, exception data, customer data, or the like), may not be actually added to the original alert block stored on the distributed register, but instead may be stored in a new block and added via an injector as described in FIG. 4. In this way, the previous block containing the generated alert is referenced by the additional block containing the updated data, such that an auditable data history is kept intact. In some embodiments, the previously stored data block containing the generated alert may be identified by using a string of characters associated with a validation or encryption hash of the previously added block (e.g., the last 3 characters of the encrypted hash value for the previously added block may be used to reference that block).

In some embodiments where additional information is required but cannot be obtained, either following an automated refresh, user outreach, further due diligence, or missing document identification, a control measure 614 may be implemented by the system. In some embodiments, the control measure 614 may include an account inactivation, such that a resource account of a particular user or multiple users may be inactivated or prohibited from making further transfers. In other embodiments, other restrictive measures may be places on accounts, such a restricting the flow of resources to or from a particular account, placing an amount of resources of the resource account on hold for a period of time, blocking access to the account for a period of time, limiting a transaction amount from the resource account or from a particular user for a period of time, or the like. In some cases, the control measure may be congruent with a tiered rule structure, wherein the severity of the alert may dictate the severity of the control measure. In other embodiments, the control measure may be applied according to a potential harm value calculated by the knowledge graph (e.g., potential loss value of resources, or the like), or by virtue of the amount of resources that exist in a particular account. In still further embodiments, the control measure may be applied according to a policy, rule, or industry recommended practice as promulgated or enacted by a third party entity.

FIG. 7 depicts a high-level process flow 700 for data integrity monitoring and securitization, in accordance with one embodiment of the present invention. As shown, the process begins at block 701 whereby the system receives user resource transaction data via a first data channel. It is understood that user resource transaction data may be received through a number of channels, including via a user device directly, via a third party entity such as a merchant, or via an existing user resource account management infrastructure where the user maintains an account. The user resource transaction data may be related to one or more transactions of resources (e.g., payments, transfers, deposits, conversions, investments, receipts, or the like), that the user initiates or completes. The user resource transaction information is securely stored on a distributed register database such that the ledger of the user resource transaction data and metadata cannot be deleted, corrupted, spoofed, or otherwise manipulated at a later time, as shown in block 702. In this way, the integrity of the data is protected against potential third party or unauthorized influence or corruption.

The data stored on the distributed register database may then be provided on a permissioned read-only basis to one or more machine learning engines for analysis, as shown in block 703. In particular, machine learning analysis may be especially adept at determining patterns in a supervised or unsupervised fashion in order to identify anomalous resource transaction characteristics. In some embodiments, relevant patterns or data characteristics may be informed by rules, thresholds, policies, or the like as configured by the entity system. Thus, the machine learning model may be initially configured and trained based on an exemplary dataset of relevant data characteristics, but the machine learning model may also adapt and learn over time in order to extrapolate and identify other relevant information or pattern characteristics in the analysis of further user resource transaction data as is retrieves and analyzes such data from the distributed register, as indicated in block 704. The user resource transaction data is then analyzed to determine reporting requirements as shown in block 705. This information may be stored in a number of formats, or may be arranged for visualization and user analysis via a knowledge graph, or the like, as shown in block 706, the information for which may be further stored on the distributed register to maintain the integrity of the chain of data. Finally, based on the results of the analysis, the system may automate outreach or interface with one or more third party entities for reporting or sharing of relevant identified data.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for data integrity monitoring and securitization, the system comprising:

at least one memory device with computer-readable program code stored thereon;

at least one communication device;

at least one processing device operatively coupled to the at least one memory device and the at least one communication device, wherein executing the computer-readable program code is configured to cause the at least one processing device to:

receive resource transaction data and user data from multiple information channels;

store the resource transaction data and user data on a distributed register database;

provide access to the distributed register database to a machine learning engine trained to identify anomalous resource transaction patterns and user relationships;

generate one or more machine learning based action recommendations via the machine learning engine based on identified anomalous resource transaction patterns and user relationships;

store identified anomalies and user relationships in a knowledge graph format on the distributed register database;

generate an alert based on one or more identified anomalies, user relationships, and one or more machine learning based action recommendations, and store the alert on the distributed register database;

analyze the generated alert to identify one or more reporting requirements, wherein the one or more reporting requirements are defined by identification of a known malfeasant actor based on one or more third party inquiries;

based on the one or more reporting requirements, automate reporting of relevant data to the one or more third parties, wherein automating reporting of relevant data to the one or more third parties further comprises providing permissioned access to the relevant data via a distributed register application in the form of a web browser, web portal, and application programming interface (API);

generate a communication channel with a third party system via a password protected web interface and provide permissioned access to the one or more machine learning based action recommendations to the third party system, wherein the one or more machine learning based action recommendations comprises missing document identification, and enacting a resource account related control measure; and transmit data associated with user activities, user authentication, user verification, and resource actions to the third party system via the password protected web interface, wherein the data associated with user activities comprises data authenticating user actions based on data provided by the third party system.

2. The system of claim 1, wherein the multiple information channels comprise resource transaction history logs, merchant data, social media data, and resource account data of a plurality of users.

3. The system of claim 1, wherein automating reporting of relevant data to one or more third parties further comprises providing a reference hash value identifying one or more block entries in the distributed register database.

4. The system of claim 1, wherein the resource account control action comprises closing a resource account of a user.

5. The system of claim 1, wherein the resource account control action further comprises automating an outreach to one or more users, wherein the outreach comprises a request for additional information.

6. The system of claim 1, wherein the user relationships further comprise a degree of separation between a plurality of users indicated by social media data.

7. A computer program product for data integrity monitoring and securitization, the computer program product comprising a non-transitory computer-readable storage medium having computer-executable instructions to:

receive resource transaction data and user data from multiple information channels;

store the resource transaction data and user data on a distributed register database;

provide access to the distributed register database to a machine learning engine trained to identify anomalous resource transaction patterns and user relationships;

generate one or more machine learning based action recommendations via the machine learning engine based on identified anomalous resource transaction patterns and user relationships;

store identified anomalies and user relationships in a knowledge graph format on the distributed register database;

generate an alert based on one or more identified anomalies, user relationships, and one or more machine learning based action recommendations, and store the alert on the distributed register database;

analyze the generated alert to identify one or more reporting requirements, wherein the one or more reporting requirements are defined by identification of a known malfeasant actor based on one or more third party inquiries;

based on the one or more reporting requirements, automate reporting of relevant data to the one or more third parties, wherein automating reporting of relevant data to the one or more third parties further comprises providing permissioned access to the relevant data via a distributed register application in the form of a web browser, web portal, and application programming interface (API);

generate a communication channel with a third party system via a password protected web interface and provide permissioned access to the one or more machine learning based action recommendations to the third party system, wherein the one or more machine learning based action recommendations comprises missing document identification, and enacting a resource account related control measure; and transmit data associated with user activities, user authentication, user verification, and resource actions to the third party system via the password protected web interface, wherein the data associated with user activities comprises data authenticating user actions based on data provided by the third party system.

8. The computer program product of claim 7, wherein the multiple information channels comprise resource transaction history logs, merchant data, social media data, and resource account data of a plurality of users.

9. The computer program product of claim 7, wherein automating reporting of relevant data to one or more third parties further comprises providing a reference hash value identifying one or more block entries in the distributed register database.

10. The computer program product of claim 7, wherein the resource account control action comprises closing a resource account of a user.

11. The computer program product of claim 7, wherein the resource account control action further comprises automating an outreach to one or more users, wherein the outreach comprises a request for additional information.

12. The computer program product of claim 7, wherein the user relationships further comprise a degree of separation between a plurality of users indicated by social media data.

13. A computer implemented method for data integrity monitoring and securitization, the computer implemented method comprising:

providing a computing system comprising a computer processing device and a non-transitory computer readable medium, where the non-transitory computer readable medium comprises configured computer program instruction code, such that when said instruction code is operated by said computer processing device, said computer processing device performs the following operations:

receive resource transaction data and user data from multiple information channels;

store the resource transaction data and user data on a distributed register database;

provide access to the distributed register database to a machine learning engine trained to identify anomalous resource transaction patterns and user relationships;

generate one or more machine learning based action recommendations via the machine learning engine based on identified anomalous resource transaction patterns and user relationships;

store identified anomalies and user relationships in a knowledge graph format on the distributed register database;

generate an alert based on one or more identified anomalies, user relationships, and one or more machine learning based action recommendations, and store the alert on the distributed register database;

analyze the generated alert to identify one or more reporting requirements, wherein the one or more reporting requirements are defined by identification of a known malfeasant actor based on one or more third party inquiries;

based on the one or more reporting requirements, automate reporting of relevant data to the one or more third parties, wherein automating reporting of relevant data to the one or more third parties further comprises providing permissioned access to the relevant data via a distributed register application in the form of a web browser, web portal, and application programming interface (API);

generate a communication channel with a third party system via a password protected web interface and provide permissioned access to the one or more machine learning based action recommendations to the third party system, wherein the one or more machine learning based action recommendations comprises missing document identification, and enacting a resource account related control measure; and transmit data associated with user activities, user authentication, user verification, and resource actions to the third party system via the password protected web interface, wherein the data associated with user activities comprises data authenticating user actions based on data provided by the third party system.

14. The computer implemented method of claim 13, wherein the multiple information channels comprise resource transaction history logs, merchant data, social media data, and resource account data of a plurality of users.

15. The computer implemented method of claim 13, wherein automating reporting of relevant data to one or more third parties further comprises providing a reference hash value identifying one or more block entries in the distributed register database.

16. The computer implemented method of claim 13, wherein the resource account control action comprises closing a resource account of a user.

17. The computer implemented method of claim 13, wherein the resource account control action further comprises automating an outreach to one or more users, wherein the outreach comprises a request for additional information.

* * * * *